Oct. 6, 1953     A. EISELE     2,654,157
BORE GAUGE

Filed July 12, 1949     2 Sheets-Sheet 1

Inventor
Andrew Eisele
By Barthel & Bugbee
Attys

Inventor
Andrew Eisele
by Barthel & Bugbee
Attys

Patented Oct. 6, 1953

2,654,157

UNITED STATES PATENT OFFICE 2,654,157

BORE GAUGE

Andrew Eisele, Detroit, Mich.

Application July 12, 1949, Serial No. 104,345

6 Claims. (Cl. 33—178)

This invention relates to gauges and, in particular, to internal bore gauges.

One object of this invention is to provide an internal bore gauge which has a measuring head with a wider measuring range than ordinary gauges, yet which has a more accurate mounting of the measuring mechanism in the head, so that wobble and consequent inaccuracy of measurement are much less than in ordinary gauges.

Another object is to provide an internal bore gauge having a head with a slide block on which both of the equalizing or centering pins are mounted so that they move together as a unit along a tubular guide member through which the motion-transmitting rod projects, thereby providing a simpler yet more accurate construction than has heretofore been provided.

Another object is to provide an internal bore gauge having a measuring head with multiple equalizing or locating pins mounted upon a very accurately movable slide block, the inner pair of pins being used in the measurement of small bores and the outer pair of pins for large bores.

Another object is to provide an internal bore gauge having a motion-transmitting mechanism which is more accurate than ordinary gauges, in that the motion-transmitting rod is rotatable and is mounted in anti-friction bearings within the hollow stem of the instrument, thereby preventing bowing or other distortion of the rod while measurements are being taken.

Another object is to provide an improved support for an internal bore gauge which assists in accurately positioning the gauge within the bore to be measured.

The present invention provides an internal bore gauge which has a measuring head construction consisting of a slide block carrying the locating, equalizing or centering pins and slidable to and fro upon a tubular guide member which in turn is rigidly but adjustably mounted upon a supporting block. In this manner, the equalizing pins are solidly connected to the slide block and hence cannot wobble. Furthermore, the slide block carries an additional pair of equalizing pins for use in the measurement of large diameter bores, these being mounted outwardly of the equalizing pins for smaller diameter bores, the various sets of pins being removable and interchangeable with long or short pins or adapters therefor. The axes of the various pins converge toward a common center coincident with the axis of the motion-transmitting rod, which is mounted in anti-friction bearings at spaced intervals to prevent errors otherwise arising by friction or by bowing of the rod during operations. The outer end of the tubular guide member is threaded to receive a stop collar which limits the travel of the slide block and therefore controls the distances the equalizing pins may move outward relatively to the movable measuring pin. An adjustable support in the form of a platform disc is optionally provided for supporting the instrument relatively to the top or outer surface of the workpiece containing the bore to be measured.

Figures 1, 2:
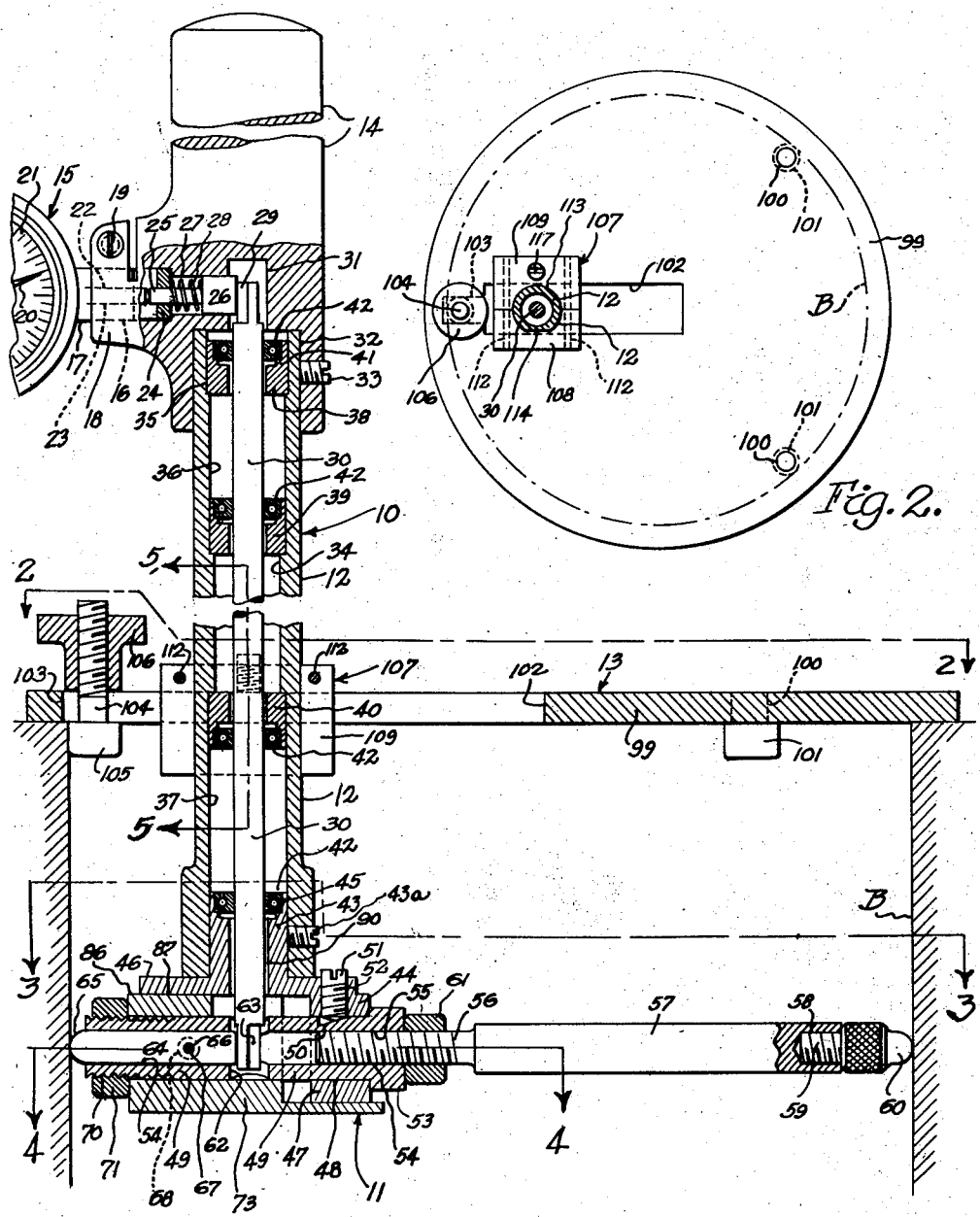
Figure 1 is a side elevation, partly in central vertical section, of an internal bore gauge, according to a preferred form of the invention.
Figure 2 is a horizontal section taken along the line 2—2 in Figure 1 and of reduced size, showing the adjustable support for the instrument.

Referring to the drawings in detail, Figure 1 shows an internal bore gauge, generally designated 10, according to one form of the invention, as including a measuring head, generally designated 11 and a tubular stem 12 mounted on a support 13. The stem 12 in turn carries a handle 14 on which is mounted a conventional dial indicator 15. For this purpose, the handle 14 is provided with a bore 16 which receives the stem 17 of the dial indicator 15. The bore 16 is formed in a split boss 18 projecting transversely from the handle 14, the split portions of the boss 18 being drawn together by a clamping screw 19. The dial indicator 15 is provided with the usual needle 20 registering with a circular scale 21. The needle 20 is connected by conventional motion multiplying mechanism (not shown) to an operating pin 22 mounted in a bore 23 in the stem 17.

The bore 16 is closed at its inner end by a centrally bored plug 24 (Figure 1) within which is reciprocably mounted a pin 25 having on its inner end an enlarged head 26 reciprocably mounted in a counterbore 27. A coil spring 28 arranged between the head 26 and the plug 24 urges the head 26 inward into contact with the flattened upper end 29 of the motion-transmitting rod 30. The end 29 extends into a socket 31 in the handle 14, and the socket 31 opens into an enlarged bore 32 which receives the stem 12 and holds it in place by means of a clamping screw 33.

The stem 12 contains a bore 34 which has enlarged portions 35, 36, and 37 from top to bottom, the adjacent bore portions forming a series of annular shoulders in which are seated anti-friction bearing assemblies 38, 39 and 40 of similar construction and similarly consisting of a hollow plug 41 bored centrally to receive the motion-transmitting rod 30 and counterbored to receive the outer races of the anti-friction ball bearing units 42. The anti-friction bearing assemblies 38, 39 and 40 are pressed into position against their respective annular shoulders.

The lower bore portion 37 receives the stem portion 43 (Figure 1) which projects upward from the base 44 of the head 11 and is held in position by the set screw 43a. The stem portion 43 is counterbored as at 45 to receive another of the anti-friction bearing units 42. The base 44 has a top portion 46 of plate-like form with an angle portion 47 projecting downward at right angles to the top portion 46. The angle portion 47 is bored transversely as at 48 to receive a tubular guide member 49. The guide member 49 is notched as at 50 to receive the end of a clamping screw 51 which is threadedly received in a threaded bore 52. The outer end of the guide member 49 is enlarged as at 53 and the guide member 49 has a bore 54 which is internally threaded at one end as at 55. The threaded portion 55 threadedly receives the threaded shank 56 on the end of the fixed measuring pin 57, the outer end of which is provided with a threaded socket 58 which receives the threaded end 59 of the rounded tip 60 which contacts the bore B to be measured. A threaded collar 61 clamps the fixed measuring pin 57 in its adjusted position relatively to the threaded bore 55.

The tubular guide member 49 (Figures 1 and 4) is provided with a transverse bore 62 crossing the bore 54 and permitting entrance of the flattened lower end 63 of the motion-transmitting rod 30. The flattened ends 29 and 63 are arranged at an angle to one another (Figure 1) so that motion upon the outer edge of the lower end 63 will rotate the rod 30 and transmit motion through the flattened upper end 29 to the head 26 on the pin 25, and thus transmit motion to the pin 22 of the dial indicator 15. To produce such motion, a movable measuring pin 64 is reciprocably mounted in the bore 54 and has a rounded outer end 65 which, like the rounded end or tip 60 of the fixed measuring pin 57, engages the bore B to be measured. The movable measuring pin 64 is bored transversely as at 66 (Figure 4) to receive a motion-limiting pin 67 which moves to and fro within a slightly larger bore 68 in the tubular guide member 49. The outer end portion of the latter is threaded as at 70 to receive an adjusting nut 71.

Figure 4:
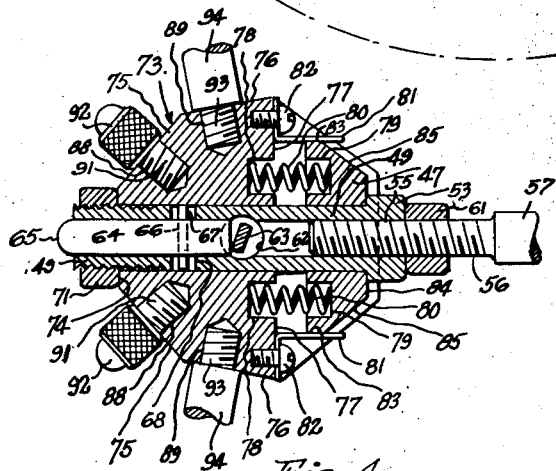
Figure 4 is a horizontal section through the measuring head and its operating mechanism, taken along the line 4—4 in Figure 1.

Slidably mounted upon the tubular guide member 49 (Figure 4) is a slide block 73 of polygonal form which, as shown, is approximately in the shape of slightly more than half a nonagon. The slide block 73 is provided with a front side 74, adjacent sharply inclined sides 75, and a slightly inclined side 76 terminating in a rear side 77. The rear side 77 is provided with a pair of sockets 78 which face opposed sockets 79 in the angle portion 47 of the base 44, each pair of opposed sockets receiving a compression coil spring 80. The springs 80 yieldingly urge the slide block 73 outward into contact with the adjusting nut 71. In order to additionally guide the slide block 73 in its reciprocation, L-shaped or angle guide members 81 are secured as by the screws 82 to the rear side 77 and slidably engage the flat portions 83 on the angle portion 47 (Figure 4). The latter is provided with a rear side 84 and inclined sides 85. The top surface 86 of the slide block 73 slidingly engages the lower surface 87 of the top portion 46 of the head base 44 so as to further guide the slide block 73 in its reciprocation.

Figure 3:
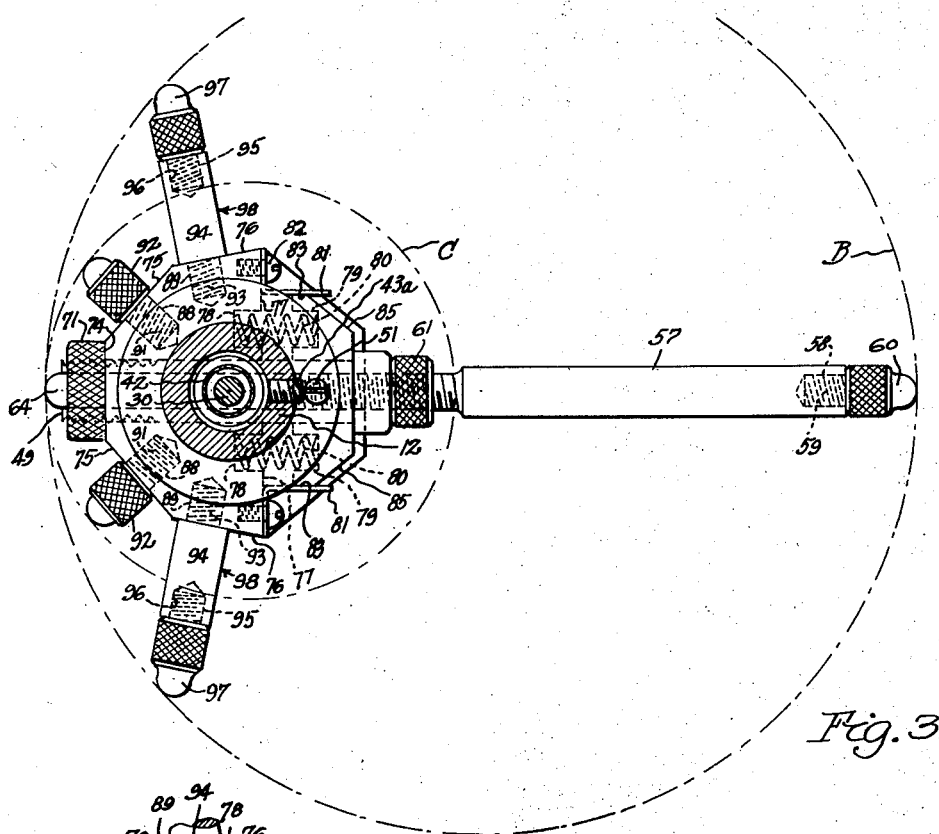
Figure 3 is a horizontal section taken along the line 3—3 in Figure 1, showing the measuring head and its various pins.

Threaded sockets 88 and 89 are formed in the respective sides 75 and 76 with their axes intersecting in the axis of the rod 30 and bore 90 through which the rod 30 passes in the stem portion 43 (Figures 1 and 4). Secured within the threaded sockets 88 are the threaded rearward ends 91 of round-ended fixed equalizing pins 92. The fixed equalizing pins 92 are similar in construction to the tip 60 on the end of the fixed measuring pin 57. Threaded into the sockets 89 are the threaded ends 93 of adapters 94, the outer ends of which are provided with similarly threaded sockets 95 which receive the threaded shanks 96 of round-ended equalizing pins 97 similar to the pins 92. The equalizing pins 92 are intended for use when a small diameter bore C is being measured (Figure 3), the elongated equalizing pins 98 consisting of the pins 97 and adapters 94 being used when large diameter bores B are to be measured. Obviously, the pins 98 are removed when small diameter bores are to be measured.

Figure 5:
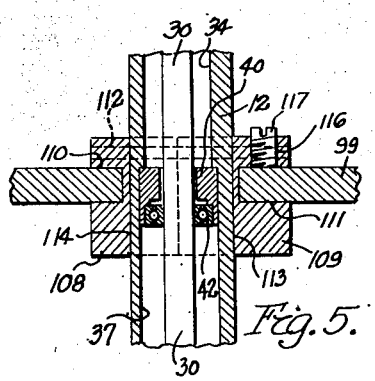
Figure 5 is a fragmentary view in central vertical section of the motion-transmitting rod mounting, taken along the line 5—5 in Figure 1.

The support 13 which is optionally used to support the internal bore gauge 10 in its proper position, consists of a plate-like disc 99 (Figures 1 and 2) having a pair of bores 100 suitably located with their centers equidistant from the center of the disc 99. The bores 100 receive the reduced diameter shanks of fixed contact pins 101 adapted to engage the wall of the bore B to be measured. The disc 99 is also provided with a radial slot 102, the axis of which is positioned at right angles to the chord or line of centers of the bores 100. The slot 102 continues in a narrower extension 103 which receives the shank 104 (Figure 1) of an adjustable contact pin 105, the shank 104 being threaded to receive a knurled lock nut 106 clamped in position. The slot 102 slidably receives a carriage 107 (Figures 2 and 5) which in turn consists of half blocks 108 and 109 grooved as at 110 and 111 to receive the opposite edges of the slot 102. The half blocks 108 and 109 are joined together by pins or screws 112 (Figures 1, 2 and 5), and in assembly are provided with a bore 113 having a flat portion 114 which engages a corresponding flat portion 115 on the outside of the stem 12. The half block 109 is bored as at 116 to receive a setscrew 117 by which the carriage 107 may be clamped in any adjusted position along the slot 102. It will be obvious that the internal bore gauge 10 may be used without the support 13, if desired, but the latter lines it up better with respect to the bore B.

*Operation*

In the operation of the internal bore gauge, the appropriate fixed measuring pins and equalizing pins are selected according to the size of the bore B or C to be measured. With different lengths of pins or adapters as described above, bores with diameters from 2½ inches to 2½ feet may be measured with a single instrument, thus giving the instrument a tremendous range not possessed by the ordinary bore gauge. If a very small diameter bore, such as the bore C (Figure 3) is to be measured, the equalizing pins 98 are removed from their sockets 89 and the equalizing pins 92 employed along with a very short fixed measuring pin 57. If, on the other hand, a large diameter bore B is to be measured, correspondingly elongated equalizing pins 98 and fixed measuring pin 57 are mounted in their respective sockets. If the support 13 is used, the thumb screw 106 and set screw 117 are loosened (Figures 1 and 5) so that the pins 101 and 105 may be brought into contact with the wall of the bore B and the carriage 107 adjusted to the proper position, as shown in Figure 1. The nut 71 on the outer end of the tubular guide member 49 is adjusted to and fro until the movable equalizing pins are properly positioned.

The instrument is now grasped by the handle 14 and lowered into the bore to be measured. As the movable measuring pin 64 is pushed inward by its contact with the bore, its inner end engages the relatively inclined flat end 63 and rotates the motion-transmitting rod 30. This in turn rotates the flattened end 29, pushing the head 26 outward and reciprocating the pins 25 and 22 to rotate the needle 20 of the dial indicator 15 relatively to the scale 21. This gives the measurement of the diameter of the bore B or C.

Meanwhile, the equalizing pins 92 and 98 have operated to insure that the common axis of the fixed and movable measuring pins 57 and 64 coincides with the diameter of the bore B or C to be measured, so that the measurement is accurately obtained. If this axis happens to be displaced to one side or the other of the diameter, the equalizing pin on the side toward which the axis is displaced will engage the bore walls before the pin on the opposite side. This pushes the slide block 73 backward along the tubular guide member 49, compressing the springs 80. The slide block 73 simultaneously engages the undersurface 87 of the upper portion 43 of the base 44 (Figure 1) and the outer surface of the tubular guide member 49 so that it is accurately and positively guided in its reciprocation, thereby preventing the equalizing pins from binding, as in prior gauges where the equalizing pins reciprocate in separate bores. The operator is thus easily able to determine when both of the equalizing pins 92 and 98 are in contact with the bore wall, at which time the axis of the fixed and movable measuring pins 57 and 64 coincides with the diameter of the bore to be measured. By the use of the adjusting nut 71 on the threaded end portions of the tubular guide member 49, the operator can move the slide block 73 outward or inward so that, after having engaged one of the bores to be measured, a minimum motion is required to engage the remaining bores. This is particularly true when a large number of bores of nearly the same diameter are to be gauged, such as, for example, the cylinder bores in automobile engine cylinder blocks. As the motion-transmitting rod 30 is turned by the action of the movable measuring pin 64, the ball-bearing assemblies 38, 39 and 40 and 42 prevent bowing or swinging of the rod and likewise insure smooth operation, with negligible friction and end play.

The support 13 is useful when a large number of vertical bores are to be measured. The gauge is mounted on the support in the manner indicated in the description of the structure. The set screw 117 (Figure 5) and the thumb nut 106 are loosened so that the entire gauge may be slid to and fro relatively to the support 13 by moving the carriage 107 to and fro in the slot 102. The pin 105 can also be slid back and forth in the slot 103 (Figure 2) until it and the fixed pins 101 are likewise properly positioned relatively to the bore wall. The set screw 117 and thumb nut 106 may then be tightened to clamp these parts in their adjusted positions. During subsequent bore gaugings, the support 13 automatically maintains the axis of the bore gauge 10 parallel to the axis of the bore to be measured, provided that the upper surface of the workpiece is accurately perpendicular to the axis of the bore while measurements are being taken.

What I claim is:

1. A bore gauge for use with a dial indicator, comprising a tubular support, a motion-transmitting member mounted in said tubular support and engageable with the operating mechanism of said dial indicator, a measuring head base mounted on said support and having a rectilinear guide portion thereon, a tubular guide member rigidly mounted on said base transverse to said support, said guide member having a bore therein and an external guide surface thereon, an equalizing pin carrier slide block reciprocably mounted on and guidedly engaging said external guide surface of said guide member and guidedly engaging said rectilinear guide portion against relative rotation therebetween, a resilient member yieldingly urging said pin carrier block outwardly of said base, a stationary measuring element mounted on said base, a movable measuring element reciprocably mounted in said bore of said guide member and operatively engaging said motion-transmitting member, and equalizing pins mounted on and movable unitarily with said pin carrier block on opposite sides of said movable measuring element.

2. A bore gauge for use with a dial indicator, comprising a tubular support, a motion-transmitting member mounted in said tubular support and engageable with the operating mechanism of said dial indicator, a measuring head base mounted on said support and having a rectilinear guide portion thereon, said base having a recess therein disposed adjacent said guide portion, a tubular guide member rigidly mounted on said base transverse to said support and projecting inwardly into said recess, said guide member having a bore therein and an external guide surface thereon, an equalizing pin carrier slide block reciprocably mounted on and guidedly engaging said external guide surface of said guide member and slidably engageable with said guide portion against relative rotation therebetween, a resilient member yieldingly urging said pin carrier block outwardly of said base, a stationary measuring element mounted on said base, a movable measuring element reciprocably mounted in said bore of said guide member and operatively engaging said motion-transmitting member, and equalizing pins mounted on and movable unitarily with said pin carrier block on opposite sides of said movable measuring element.

3. A bore gauge for use with a dial indicator, comprising a tubular support, a motion-transmitting member mounted in said tubular support and engageable with the operating mechanism of said dial indicator, a measuring head base mounted on said support and having a rectilinear guide portion thereon, a tubular guide member rigidly mounted on said base transverse to said suport, said guide member having a bore therein and an external guide surface thereon, an equalizing pin carrier slide block reciprocably mounted on and guidedly engaging said external guide surface of said guide member and having a bore slidably receiving said guide member, a resilient member yieldingly urging said pin carrier block outwardly of said base, a stationary measuring element mounted on said base, a movable measuring element reciprocably mounted in said bore of said guide member and operatively engaging said motion-transmitting member, and equalizing pins mounted on and movable unitarily with said pin carrier block on opposite sides of said movable measuring element.

4. A bore gauge for use with a dial indicator, comprising a tubular support, a motion-transmitting member mounted in said tubular support and engageable with the operating mechanism of said dial indicator, a measuring head base mounted on said support and having a rectilinear guide portion thereon, a tubular guide member rigidly mounted on said base transverse to said support, said guide member having a bore therein and an external guide surface thereon, an equalizing pin carrier slide block reciprocably mounted on and guidedly engaging said external guide surface of said guide member, a movable stop adjustably mounted on said guide member and engageable with said pin carrier block for limiting the travel thereof, a resilient member yieldingly urging said pin carrier block outwardly of said base, a stationary measuring element mounted on said base, a movable measuring element reciprocably mounted in said bore of said guide member and operatively engaging said motion-transmitting member, and equalizing pins mounted on and movable unitarily with said pin carrier block on opposite sides of said movable measuring element.

5. A bore gauge for use with a dial indicator, comprising a tubular support, a motion-transmitting member mounted in said tubular support and engageable with the operating mechanism of said dial indicator, a measuring head base mounted on said support and having a rectilinear guide portion thereon, a tubular guide member rigidly mounted on said base transverse to said support, said guide member having a bore therein and an external guide surface thereon, an equalizing pin carrier slide block reciprocably mounted on and guidedly engaging said external guide surface of said guide member, said guide member being threaded near one end thereof, a threaded stop mounted on said threaded guide member, a resilient member yieldingly urging said pin carrier block outwardly of said base, a stationary measuring element mounted on said base, a movable measuring element reciprocably mounted in said bore of said guide member and operatively engaging said motion-transmitting member, and equalizing pins mounted on and movable unitarily with said pin carrier block on opposite sides of said movable measuring element.

6. A bore gauge for use with a dial indicator, comprising a tubular support, a motion-transmitting member mounted in said tubular support and engageable with the operating mechanism of said dial indicator, a measuring head base mounted on said support and having a rectilinear guide portion thereon, a tubular guide member rigidly mounted on said base transverse to said support, said guide member having a bore therein and an external guide surface thereon, an equalizing pin carrier slide block reciprocably mounted on and guidedly engaging said external guide surface of said guide member, a resilient member yieldingly urging said pin carrier block outwardly of said base, a stationary measuring element mounted on said guide member, a movable measuring element reciprocably mounted in said bore of said guide member and operatively engaging said motion-transmitting member, and equalizing pins mounted on and movable unitarily with said pin carrier block on opposite sides of said movable measuring element.

ANDREW EISELE.

References Cited in the file of this patent

UNITED STATES PATENTS

| Number | Name | Date |
|---|---|---|
| 2,192,900 | Eisele | Mar. 12, 1940 |
| 2,239,981 | Terry et al. | Apr. 29, 1941 |
| 2,241,287 | Westcott | May 6, 1941 |
| 2,312,222 | Tanner | Feb. 23, 1943 |
| 2,395,122 | Worthen | Sept. 18, 1945 |
| 2,395,157 | Nilsson et al. | Sept. 18, 1945 |
| 2,438,274 | Eisele | Mar. 23, 1948 |
| 2,439,008 | Kellem | Apr. 6 1948 |
| 2,483,060 | Niedelmann et al. | Sept. 27, 1949 |

FOREIGN PATENTS

| Number | Country | Date |
|---|---|---|
| 238,163 | Switzerland | Oct. 1, 1945 |
| 512,736 | Great Britain | Sept. 25, 1939 |
| 573,859 | Great Britain | Dec. 10, 1945 |